United States Patent
Tsirkin

(10) Patent No.: US 9,870,248 B2
(45) Date of Patent: Jan. 16, 2018

(54) PAGE TABLE BASED DIRTY PAGE TRACKING

(71) Applicant: Red Hat Israel, Ltd., Raanana (IL)

(72) Inventor: Michael Tsirkin, Yokneam Illit (IL)

(73) Assignee: Red Hat Israel, Ltd., Raanana (IL)

( * ) Notice: Subject to any disclaimer, the term of this patent is extended or adjusted under 35 U.S.C. 154(b) by 95 days.

(21) Appl. No.: 14/825,508

(22) Filed: Aug. 13, 2015

(65) Prior Publication Data

US 2017/0046185 A1     Feb. 16, 2017

(51) Int. Cl.
    *G06F 9/455*      (2006.01)
    *G06F 12/1009*      (2016.01)

(52) U.S. Cl.
    CPC ...... *G06F 9/45558* (2013.01); *G06F 12/1009* (2013.01); *G06F 2009/45583* (2013.01); *G06F 2212/152* (2013.01)

(58) Field of Classification Search
None
See application file for complete search history.

(56) References Cited

U.S. PATENT DOCUMENTS

| | | | | |
|---|---|---|---|---|
| 6,789,156 B1 * | 9/2004 | Waldspurger | ....... | G06F 12/1018 711/202 |
| 7,552,298 B2 | 6/2009 | Bestler | | |
| 7,774,556 B2 | 8/2010 | Karamcheti et al. | | |
| 8,201,169 B2 | 6/2012 | Venkitachalam et al. | | |
| 8,307,191 B1 * | 11/2012 | Jain | ........ | G06F 12/109 711/202 |
| 8,719,661 B1 * | 5/2014 | Gulati | ................ | G06F 11/1412 714/764 |
| 8,761,187 B2 | 6/2014 | Barde | | |
| 8,812,907 B1 | 8/2014 | Bissett et al. | | |
| 9,430,034 B2 * | 8/2016 | Jin | ...................... | G06F 9/45558 |
| 2005/0207407 A1 * | 9/2005 | Baumberger | ........... | H04L 49/90 370/389 |
| 2008/0022016 A1 * | 1/2008 | Tripathi | .............. | G06F 12/1081 709/250 |
| 2009/0013149 A1 * | 1/2009 | Uhlig | .................... | G06F 12/109 711/207 |

(Continued)

OTHER PUBLICATIONS

27. Vhost Sample Application—DPDK 2.0.0 documentation, http://dpdk.org/doc/guides/sample_app_ug/vhost.html, 16 pages, retrieved on Jun. 2, 2015.

(Continued)

*Primary Examiner* — Hiren Patel
(74) *Attorney, Agent, or Firm* — Lowenstein Sandler LLP

(57) ABSTRACT

A hypervisor identifies a set of pages associated with a guest operating system (OS) of a virtual machine (VM) that are shared with an application. The hypervisor maps each of the set of pages associated with the guest OS to a corresponding page associated with the application. The hypervisor modifies a write protection attribute for each corresponding page associated with the application to cause a protection page fault upon an application attempt to update the corresponding page. The hypervisor detects updated pages by detecting the protection page fault upon the application attempt to update one of the corresponding pages associated with the application. The hypervisor then logs a modification of each updated corresponding page.

18 Claims, 5 Drawing Sheets

(56) References Cited

U.S. PATENT DOCUMENTS

| | | | |
|---|---|---|---|
| 2010/0031271 A1* | 2/2010 | Corry | G06F 9/544 719/312 |
| 2010/0058358 A1* | 3/2010 | Franke | G06F 12/1027 719/319 |
| 2010/0088474 A1* | 4/2010 | Agesen | G06F 9/45537 711/147 |
| 2010/0107159 A1* | 4/2010 | Radhakrishnan | G06F 9/5055 718/1 |
| 2010/0287455 A1* | 11/2010 | Tripathi | G06F 9/45558 714/807 |
| 2011/0209148 A1* | 8/2011 | Yamasaki | G06F 9/5077 718/1 |
| 2011/0213911 A1* | 9/2011 | Eidus | G06F 9/5033 711/6 |
| 2011/0302577 A1 | 12/2011 | Reuther et al. | |
| 2011/0314469 A1* | 12/2011 | Qian | H04L 49/9057 718/1 |
| 2012/0011504 A1* | 1/2012 | Ahmad | G06F 12/08 718/1 |
| 2012/0017028 A1* | 1/2012 | Tsirkin | G06F 12/08 711/6 |
| 2012/0054409 A1* | 3/2012 | Block | G06F 11/1484 711/6 |
| 2012/0131259 A1* | 5/2012 | Baskakov | G06F 12/109 711/6 |
| 2012/0216007 A1 | 8/2012 | Tsirkin | |
| 2013/0024598 A1* | 1/2013 | Serebrin | G06F 12/1036 711/6 |
| 2013/0205106 A1* | 8/2013 | Tati | G06F 3/061 711/159 |
| 2014/0181461 A1 | 6/2014 | Kegel et al. | |
| 2014/0245293 A1* | 8/2014 | Tsirkin | G06F 9/455 718/1 |
| 2014/0281118 A1* | 9/2014 | Hepkin | G06F 9/45533 711/6 |
| 2014/0359607 A1* | 12/2014 | Tsirkin | G06F 9/48 718/1 |
| 2015/0052323 A1* | 2/2015 | Noel | G06F 12/00 711/162 |
| 2015/0324297 A1* | 11/2015 | Tati | G06F 12/10 711/6 |
| 2016/0034397 A1* | 2/2016 | Lam | G06F 12/0842 711/119 |
| 2016/0070587 A1* | 3/2016 | Saladi | G06F 9/45558 718/1 |

OTHER PUBLICATIONS

Vijayakumar et al. "Optimizing Dirty-Page Tracking Mechanism for Virtualization Based Fault Tolerance", Stony Brook University, http://www.slideshare.net/MPNIKHIL/optimizing-dirty-page-tracking-mechanism-for-virtualization-based-fault-tolerance, 12 pages, Aug. 12, 2013.

Digiglio et al. "High Performance, Open Standard Virtualization with NFV and SDN", White Paper, Software Product Marketing, Intel Corporation; Product Line Manager, Wind River Systems, Inc., 14 pages, revised on Jan. 2015.

Memory-faq, http://landley.net/writing/memory-faq.txt, 11 pages, retrieved on Jun. 2, 2015.

\* cited by examiner

PAGE TABLE BASED DIRTY PAGE TRACKING

TECHNICAL FIELD

The present disclosure is generally related to computer systems, and more particularly, to memory management in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system."

In a virtualized environment, the hypervisor may abstract the physical layer and present this abstraction to a VM to use, by providing interfaces between the underlying hardware and virtual devices of the VM. Memory virtualization may be implemented by employing a page table (PT) which is a memory structure translating virtual memory addresses to physical memory addresses. A hypervisor may detect when a VM modifies memory by using "dirty page tracking."

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
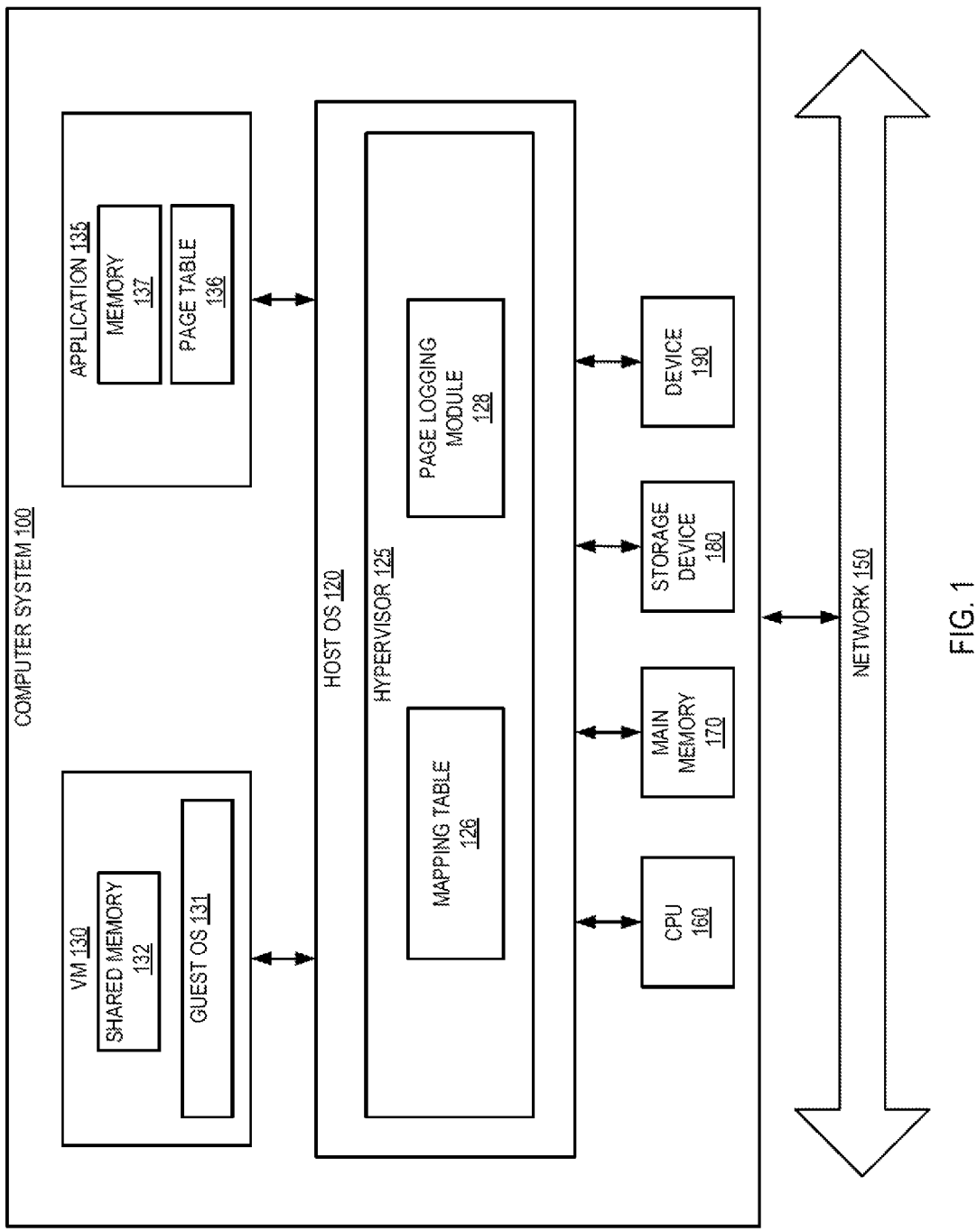
FIG. 1 depicts a high-level component diagram of an example computer system architecture, in accordance with one or more aspects of the present disclosure.

Described herein are methods and systems for page table based dirty page tracking. In a virtualized environment, a hypervisor may detect when a VM modifies memory by using "dirty page tracking." A hypervisor may need to monitor when a VM modifies memory in order to copy the state of the VM for failover purposes, to copy the state of the VM to another host for VM migration, or for graphical frame buffer emulation. Upon completing the memory copying operation, the hypervisor may re-copy the memory pages which have been modified, or became "dirty," during the memory copying operation. Typically, dirty page tracking may be implemented by write-protecting a page (to prevent writing data to a page), generating a page fault causing an exit to the hypervisor, which then logs the access and enables writes to the page. However, if a component other than a VM (e.g., another VM, the hypervisor, an application running on the hypervisor, etc.) modifies VM memory, tracking those memory changes e.g., for VM migration, tot barking up the state of the VM for fault tolerance, for using the VM memory to emulate a graphical frame buffer, etc.) can be inefficient and computationally expensive. Tracking updates made by an application to memory of a VM that is shared with the application can involve implementing substantial coding changes to the application in or to notify the hypervisor of the particular memory pages that have been updated. Otherwise, the hypervisor would be unaware of the updates made by the application, and subsequently, these updates may be lost in the event of a VM migration, VM state backup, graphical frame buffer emulation, or similar operations.

Aspects of the present disclosure address the above noted and other deficiencies by implementing page table based dirty page tracking for input-output (IO) operations. The hypervisor can identify a set of pages that are shared by the VM with an application. The hypervisor can then create a mapping between the application memory page and the corresponding shared page of the VM. The hypervisor may then write protect the application page in a page table associated with the application so that any update of the shared page by the application will notify the hypervisor of the update via the generation of a page fault. Thus, updates to shared pages by an application can be processed efficiently in the event of VM migration, VM state backup, graphical frame buffer emulation, or the like. Moreover, no coding changes to the application should be required, thereby reducing system administration complexity.

In an illustrative example, a hypervisor can identify a set of pages associated with the guest operating system (OS) of a virtual machine (VM) that are shared with an application that is external to the VM (e.g., not executing within the VM). The set of pages shared with the application may be a proper subset of a plurality of memory pages associated with the guest OS. The hypervisor may identify the set of pages during a memory sharing setup process when the VM is configured. The memory sharing may be configured by a user (e.g., an administrator) via a user interface for a virtualization manager (e.g., a graphical user interface, command line interface, etc.), in response to a request sent by the VM, in response to a request sent by the application, or in any similar manner.

In some implementations, an application that shares the set of pages with the guest OS may be a second VM (either running on the same hypervisor or a different hypervisor). Alternatively, the application may be a component of the hypervisor, or a separate application program that is managed by the hypervisor. In an illustrative example, a virtual network interface controller (NIC) may be implemented as an application that executes on a host machine (e.g., the machine that also executes the hypervisor). In order for the virtual NIC application to send communication packets to the guest OS, the packets may be written by the virtual NIC application into a portion of guest OS memory. Thus, the guest OS memory pages that receive and store the communication packets should be shared with the virtual NIC application.

The hypervisor may then map each of the set of shared pages associated with the guest OS of the VM to a corresponding page associated with the application. In some implementations, the mapping may be stored in a mapping table accessible by the hypervisor. The mapping table may include a unique identifier that identifies the VM (e.g., the process id of the VM that is assigned by the hypervisor at VM start-up), the guest physical address of the shared page of the VM, and the address of the corresponding page associated with the application. The hypervisor may use the mapping table to complete address translation for logging shared page updates upon detecting that the application has attempted to modify the shared page. The page table may additionally, or alternatively, include other information to assist the hypervisor in completing address translation. For example, the mapping table may contain the host virtual address associated with the shared page, and may subsequently utilize a hypervisor shadow page table to complete the conversion from the host virtual address to the guest physical address to complete the address translation.

In some implementations, the hypervisor may then receive a request to monitor the plurality of memory pages associated with the guest OS of the VM. The request may be associated with migrating the VM from one host to another, backing up the memory state of the VM for fault tolerance purposes (e.g., disaster recovery backups, etc.), using the memory pages as a graphical frame buffer to forward information to a display, or the like. The request may be received from a user (e.g., an administrator) initiating VM migration via a user interface for a virtualization manager (e.g., a graphical user interface, command line interface, etc.), as a result of a change in the environment that causes a virtualization manager to initiate a VM migration, a client device that connects to the hypervisor requesting graphics updates, or in any similar manner. In an alternative example, the hypervisor can receive the request to monitor the plurality of memory pages from a component of the hypervisor during hypervisor start-up.

The hypervisor may then modify a write protection attribute for each page associated with the application that corresponds to a page shared by the VM with the application. The write protection attribute, when modified appropriately, may cause a protection page fault upon an application attempt to update the page. In some implementations, the write protection attribute may be an attribute stored in an entry in the application page table for each of the pages associated with the application. The hypervisor may modify the write protection attribute (e.g., write protect the application page) for each of the pages associated with the application that correspond to pages shared by the VM in response to the received request to monitor the memory pages of the VM. Alternatively, the hypervisor may modify the write protection attribute to cause the page fault at system configuration, responsive to a request received from the application, or in any other manner. Subsequent attempts by the application to update any of the memory pages may then cause a page protection fault to the hypervisor. For example, when a virtual NIC implemented as an application writes a communication packet to a shared page that is write protected, the write of the communication packet may cause a page protection fault. The page protection fault can indicate to the hypervisor that the virtual NIC has updated the shared page without requiring the virtual NIC to explicitly notify the hypervisor directly.

The hypervisor may then detect an application update to any of the pages associated with the application that correspond to the set of pages shared by the VM. The hypervisor may detect the updated pages by detecting the protection page fault that is caused by the application attempt to update one of the pages associated with the application. Upon detecting an updated page, the hypervisor may then log the modification to the updated page. Logging the update may include sending a copy of the shared page to a remote hypervisor (e.g., in the case of VM migration), sending a copy of the shared page to a remote destination (e.g., in the case of fault tolerance backup processing), sending the contents of the memory page to a connected client to update a display (e.g., in the case of graphics processing), copying the updated shared page to a data store, adding an entry to a log file to indicate that the page has been updated (e.g., so the update may be processed by another task at a later time), or the like.

In an illustrative example, the hypervisor may log the modification of a page updated by the application by first translating the address of the updated page to a guest physical address of the corresponding shared page associated with the guest OS of the VM. In some implementations, the hypervisor may complete the translation using the mapping table noted above. The hypervisor may then store an entry in a log file associated with the VM that stores a list of updated shared pages associated with the VM. The log file entry can include the guest physical address of the shared page, an update status indicator, or any similar information to identify the update status of the shared page. The update status indicator may be a dirty page bit (or flag) that identifies whether or not the page has been updated. For example, the hypervisor may inspect the dirty page bit in the log file entry associated with the page, and if set to a particular value (e.g., a '1' indicating the page has been updated), the hypervisor may determine that the page has been updated. The hypervisor may use the information in the log file to determine whether the modified shared page needs to be copied to another location in the event of a VM migration, VM state backup, graphical frame buffer emulation operation, or the like.

In another illustrative example, the hypervisor may log the modification of a page updated by the application by first storing, an entry in a log file (associated with the application) that stores a list of updated shared pages associated with the VM. Thus, application page updates can be processed asynchronously in batches. The application log file can be monitored periodically to determine if any updates need to be transferred to a log file associated with the VM at a later time. For example, the hypervisor may start a timer and upon the expiration of the timer, the page update in the application log may be transferred to a log associated with the VM. Alternatively, the hypervisor may utilize a polling module that monitors the application log file continuously so that page updates made by the application may be processed immediately.

Once an entry in the application log file has been identified, the hypervisor may translate the address of the updated page to a guest physical address of the corresponding shared page associated with the guest OS of the VM. In some implementations, the hypervisor may complete the translation using the mapping table noted above. The hypervisor may then store an entry in a log file associated with the VM that stores a list of updated shared pages associated with the VM. The log file entry can include the guest physical address of the shared page, an update status indicator, or any similar information to identify the update status of the shared page.

The update status indicator may be a dirty page bit (or flag) that identifies whether or not the page has been updated. For example, the hypervisor may inspect the dirty page bit in the log file entry associated with the page, and if set to a particular value (e.g., a '1' indicating the page has been updated), the hypervisor may determine that the page has been updated. The hypervisor may use the information in the log file to determine whether the modified shared page needs to be copied to another location in the event of a VM migration, VM state backup, graphical frame buffer emulation operation, or the like.

Aspects of the present disclosure are thus capable of implementing page table based dirty page tracking for input-output (IO) operations. More particularly, updates to shared pages made by an application can be processed efficiently without requiring coding changes to the application, thereby reducing system administration complexity.

FIG. 1 depicts a high-level component diagram of an illustrative example of a computer system 100, in accordance with one or more aspects of the present disclosure. One skilled in the art will appreciate that other architectures for computer system 100 are possible, and that the implementation of a computer system utilizing examples of the invention are not necessarily limited to the specific architecture depicted by FIG. 1.

As shown in FIG. 1, the computer system 100 is connected to a network 150 and comprises one or more central process units (CPU) 160, main memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, main memory 170 may be non-uniform access (NUMA), such that memory access time depends on the memory location relative to CPU 160. It should be noted that although, for simplicity, a single CPU 160, storage device 180, and device 190 are depicted in FIG. 1, other embodiments of computer system 100 may comprise a plurality of CPUs, storage devices, and devices.

The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

Computer system 100 may additionally comprise one or more virtual machine (VM) 130, one or more application 135, and host operating system (OS) 120. VM 130 is a software implementation of a machine that executes programs as though it was an actual physical machine. Application 135 may be a second VM (either running on the same hypervisor or a different hypervisor, a component of the hypervisor, or separate application program that is executed by the hypervisor. For example, application 135 may be a virtual network interface controller (NIC) implemented as an application that executes on computer system 100 (e.g., the machine that also executes hypervisor 125). Host OS 120 manages the hardware resources of the computer system and provides functions such as inter-process communication, scheduling, memory management, and so forth.

VM 130 may comprise a guest operating system (OS) 131 that handles the execution of applications within the virtual machine. VM 130 may also include shared memory 132, which may be the set of memory pages associated with VM 130 that are shared with application 135. It should be noted that although, for simplicity, a single VM 130 is depicted in FIG. 1, computer system 100 may host a plurality VMs 130.

Application 135 may comprise memory 137 and page table 137. Memory 137 may be the set of memory pages associated with application 135 that correspond to the set of memory pages in shared memory 132 of VM 130. Page table 136 may be used by hypervisor 125 to write protect the pages of memory 137 to implement page table based IO dirty page tracking as described below with respect to FIGS. 2-4. It should be noted that although, for simplicity, a single application 135 is depicted in FIG. 1, computer system 100 may host a plurality applications 135.

Host OS 120 may comprise a hypervisor 125, which provides a virtual operating platform for VMs 130 and manages their execution. Hypervisor 125 may comprise mapping table 126 and page logging module 128. It should be noted that in some alternative implementations, hypervisor 125 may be external to host OS 120, rather than embedded within host OS 120, or may replace host OS 120.

Page logging module 128 can facilitate page table based IO dirty page tracking as described below with respect to FIGS. 2-4. Page logging module 128 may receive requests to monitor memory pages of guest OS 135, identify the memory pages of shared memory 132 that are shared with application 135, map addresses of the pages in memory 137 to the corresponding pages in shared memory 132 (to be stored in mapping table 126), and log any updates made by application 135 to shared memory 132. Mapping table 126 may include a unique identifier that identifies VM 130 (e.g., the process id of VM 130 that is assigned by the hypervisor 125 at VM start-up), the guest physical address of the shared page in shared memory 132 of VM 130, and the address of the corresponding page associated with application 135 in memory 137. Hypervisor 125 may use mapping table 126 to complete address translation for logging updates to shared memory 132 upon detecting that application 135 has attempted to modify memory 137. Mapping table 126 can be an area of hypervisor memory, a shared memory space, a data structure saved in storage device 180, or the like.

Figure 2:
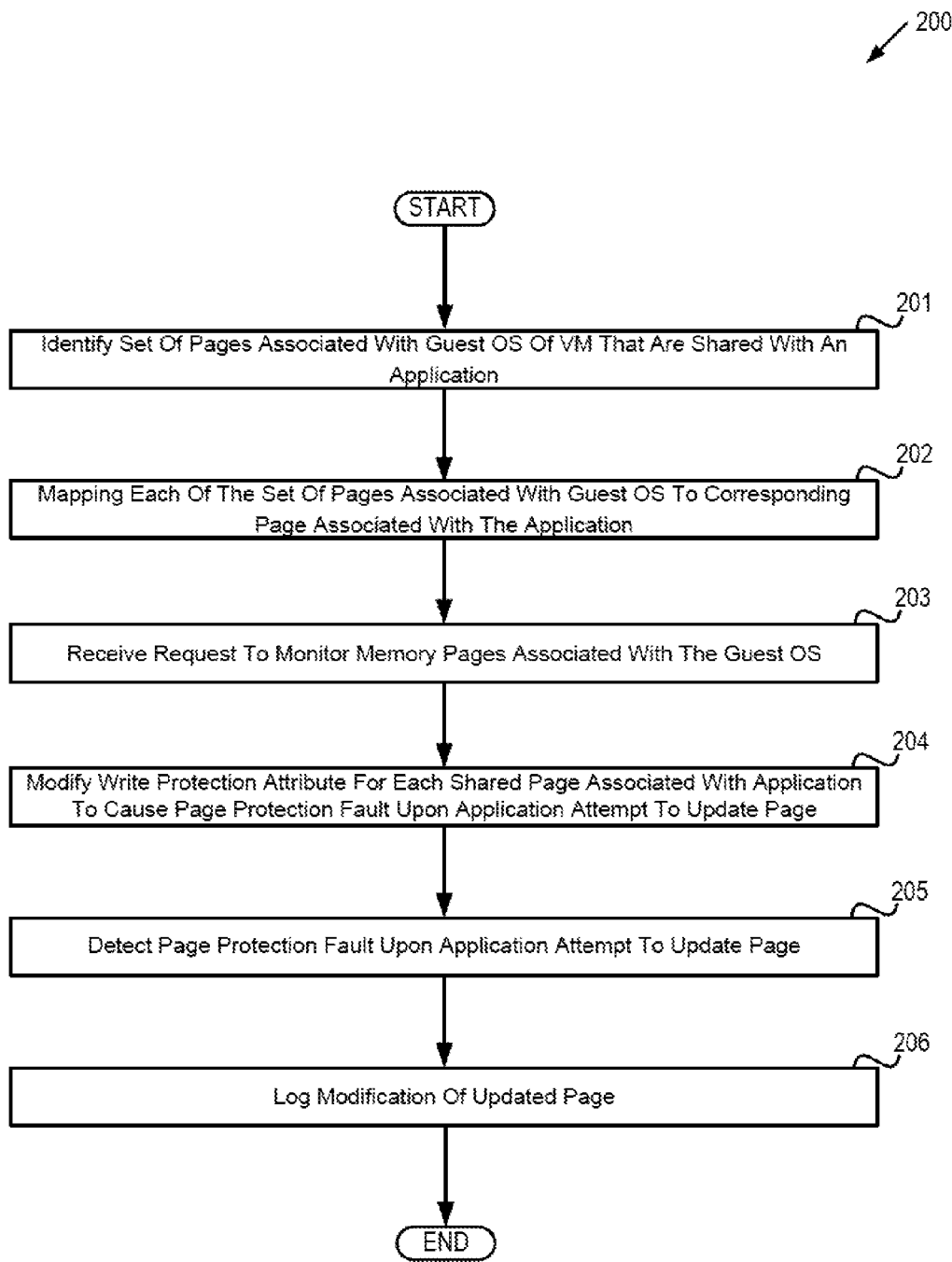
FIG. 2 depicts a flow diagram of a method for page table based IO dirty page tracking, in accordance with one or more aspects of the present disclosure.

FIG. 2 depicts a flow diagram of an example method 200 for page table based IO duty page tracking. The method may be performed by processing logic that may comprise hardware (circuitry, dedicated logic, etc.), software (such as is run on a general purpose computer system or a dedicated machine), or a combination of both. In one illustrative example, method 200 may be performed by page logging module 128 of hypervisor 125 in FIG. 1. Alternatively, some or all of method 200 might be performed by another module or machine. It should be noted that blocks depicted in FIG. 2 could be performed simultaneously or in a different order than that depicted.

At block 201, processing logic can identify a set of pages associated with the guest OS of a VM that are shared with an application. The set of pages shared with the application may be a proper subset of a plurality of memory pages associated with the guest OS. Processing logic may identify the set of pages during a memory sharing setup process when the VM is configured. The memory sharing may be configured by a user (e.g., an administrator) via a user interface for a virtualization manager (e.g., a graphical user interface, command line interface, etc.), in response to a request sent by the VM, in response to a request sent by the application, or in any similar manner.

At block 202, processing logic can map each of the set of pages associated with the guest OS to corresponding pages associated with the application. In some implementations, the mapping may be stored in a mapping table accessible by a hypervisor. The mapping table may include a unique identifier that identifies the VM (e.g., the process id of the VM that is assigned by the hypervisor at VM start-up), the guest physical address of the shared page of the VM, and the address of the corresponding page associated with the application. Processing logic may use the mapping table to complete address translation for logging shared page updates upon detecting that the application has attempted to modify the shared page. The page table may additionally, or alternatively, include other information to assist the hypervisor in completing address translation. For example, the mapping table may contain the host virtual address associated with the shared page, and may subsequently utilize a hypervisor shadow page table to complete the conversion from the host virtual address to the guest physical address to complete the address translation.

At block 203, processing logic can receive a request monitor the memory pages associated with the guest OS. The request may be associated with migrating the VM from host to another, backing up the memory state of the VM for fault tolerance purposes (e.g., disaster recovery backups, etc.), using the memory pages as a graphical frame buffer to forward information to a display, or the like. The request may be received from a user (e.g., an administrator) initiating VM migration via a user interface for a virtualization manager (e.g., a graphical user interface, command line interface, etc.), as a result of a change in the environment that causes a virtualization manager to initiate a VM migration, a client device that connects to the hypervisor requesting graphics updates, or in any similar manner. In an alternative example, processing logic may receive the request to monitor the plurality of memory pages from a component of the hypervisor during hypervisor start-up.

At block 204, processing logic can modify a write protection attribute for each shared page associated with the application to cause a page protection fault upon an application attempt to update the page. The write protection attribute, when modified appropriately, may cause a protection page fault upon an application attempt to update the page. In some implementations, the write protection attribute may be an attribute stored in an entry in the application page table for each of the pages associated with the application. Processing logic may modify the write protection attribute (e.g., write protect the application page) for each of the pages associated with the application that correspond to pages shared by the VM in response to the received request to monitor the memory pages of the VM at block 203.

At block 205, processing logic can detect a page protection fault upon an application attempt to update a page. At block 206, processing logic can log the modification of the updated page. Logging the update may include sending a copy of the shared page to a remote hypervisor (e.g., in the case of VM migration), sending a copy of the shared page to a remote destination (e.g., in the case of fault tolerance backup processing), sending the contents of the memory page to a connected client to update a display (e.g., in the case of graphics processing), copying the updated shared page to a data store, adding an entry to a log file to indicate that the page has been updated (e.g., so the update may be processed by another task at a later time), or the like. In some implementations, processing logic may log the modification of the updated page as described below with respect to FIGS. 3-4. After block 206, the method of FIG. 2 terminates.

Figure 3:
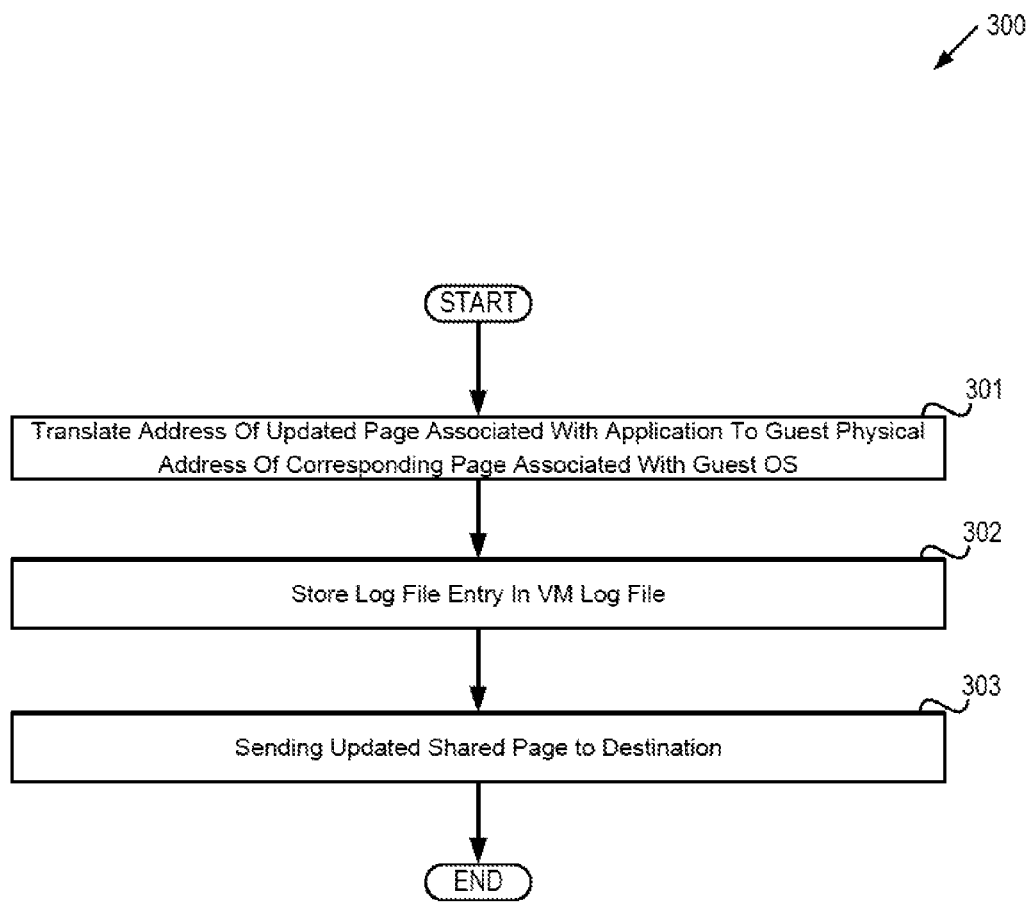
FIG. 3 depicts a flow diagram of a method for logging page updates using a VM log file, in accordance with one or more aspects of the present disclosure.

FIG. 3 depicts a flow diagram of an example method 300 for logging page updates using a VM log file. The method may be performed by processing logic that may comprise hardware (circuitry, dedicated logic, etc.), software (such as is run on a general purpose computer system or a dedicated machine), or a combination of both. In one illustrative example, method 300 may be performed by page logging module 128 of hypervisor 125 in FIG. 1. Alternatively, some or all of method 300 might be performed by another module or machine. It should be noted that blocks depicted in FIG. 3 could be performed simultaneously or in a different order than that depicted.

At block 301, processing logic can translate the address of an updated page associated with an application to the guest physical address of the corresponding page associated with the guest OS. In some implementations, processing logic can translate the address using a mapping table such as mapping table 126 of FIG. 1. At block 302, processing logic can store a log file entry in a VM log file associated with the VM that stores a list of updated shared pages associated with the VM. The VM log file may be stored in an area of hypervisor memory, a shared memory space, a data structure saved in storage device, or the like. The log file entry can include the guest physical address of the shared page, an update status indicator, or any similar information to identify the update status of the shared page. The update status indicator may be a dirty page bit (or flag) that identifies whether or not the page has been updated. For example, the hypervisor may inspect the dirty page bit in the log file entry associated with the page, and if set to a particular value (e.g., a '1' indicating the page has been updated), processing logic may determine that the page has been updated. Processing logic may use the information in the log file to determine whether the modified shared page needs to be copied to another location in the event of a VM migration, VM state backup, graphical frame buffer emulation operation, or the like.

At block 303, processing logic can send an updated shared page to its intended destination. For example, processing logic may send a copy of the shared page to a remote hypervisor (e.g., in the case of VM migration), send a copy of the shared page to a remote destination (e.g., in the case of fault tolerance backup processing), send the contents of the memory page to a connected client to update a display (e.g., in the case of graphics processing), copy the updated shared page to a data store, or the like. After block 303, the method of FIG. 3 terminates.

Figure 4:
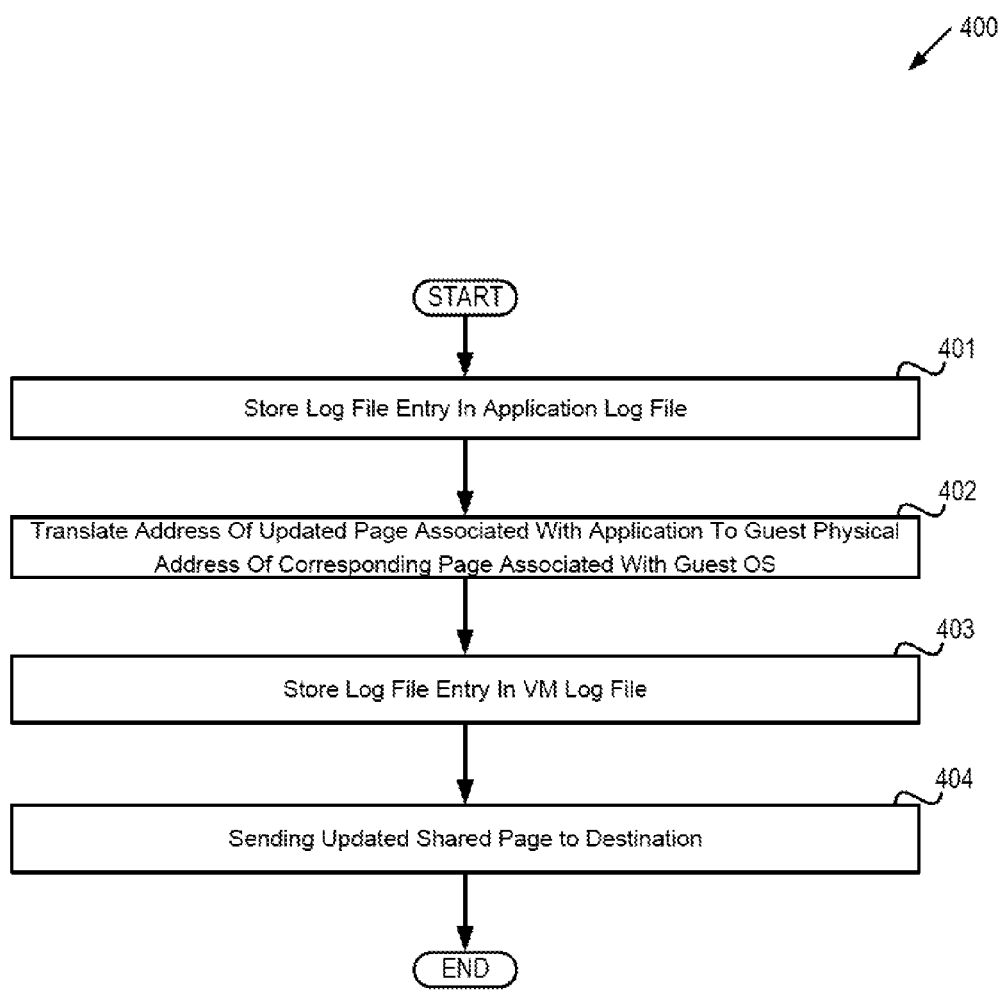
FIG. 4 depicts a flow diagram of a method for logging page updates using an application log file, in accordance with one or more aspects of the present disclosure.

FIG. 4 depicts a flow diagram of an example method 400 for logging page updates using an application log file. The method may be performed by processing logic that may comprise hardware (circuitry dedicated logic, etc.), software such as is run on a general purpose computer system or a dedicated machine), or a combination of both. In one illustrative example, method 400 may be performed by page logging module 128 of hypervisor 125 in FIG. 1. Alternatively, some or all of method 400 might be performed by another module or machine. It should be noted that blocks depicted in FIG. 4 could be performed simultaneously or in a different order than that depicted.

At block 401, processing logic can store a log file entry in an application log file associated with the application that stores a list of updated shared pages. The application log file may be stored in an area of hypervisor memory, a shared memory space, a data structure saved in storage device, or the like. The application log file can be monitored periodically to determine if any updates need to be transferred to a log file associated with the VM at a later time. For example, processing logic may start a timer and upon the expiration of the timer, the page update in the application log may be transferred to a log associated with the VM. Alternatively, processing logic may utilize a polling module that monitors the application log file continuously so that page updates made by the application may be processed immediately.

At block 402, processing logic can read the application log entry stored at block 401 and translate the address of an updated page associated with an application to the guest physical address of the corresponding page associated with the guest OS. In some implementations, processing logic can translate the address using a mapping table such as mapping table 126 of FIG. 1.

At block 403, processing logic can store a log file entry in a VM log file associated with the VM that stores a list of updated shared pages associated with the VM. The log file entry can include the guest physical address of the shared, an update status indicator, or any similar information to identify the update status of the shared page. The update status indicator may be a dirty page bit (or flag) that identifies whether or not the page has been updated. For example, the hypervisor may inspect the dirty page bit in the log file entry associated with the page, and if set to a particular value (e.g., a '1' indicating the page has been updated), processing logic may determine that the page has been updated. Processing logic may use the information in the log file to determine whether the modified shared page needs to be copied to another location in the event of a VM migration, VM state backup, graphical frame buffer emulation operation, or the like.

At block 404, processing logic can send an updated shared page to its intended destination. For example, processing logic may send a copy of the shared page to a remote hypervisor (e.g., in the case of VM migration), send a copy of the shared page to a remote destination (e.g., in the case of fault tolerance backup processing), send the contents of the memory page to a connected client to update a display (e.g., in the case of graphics processing), copy the updated shared page to a data store, or the like.

Figure 5:
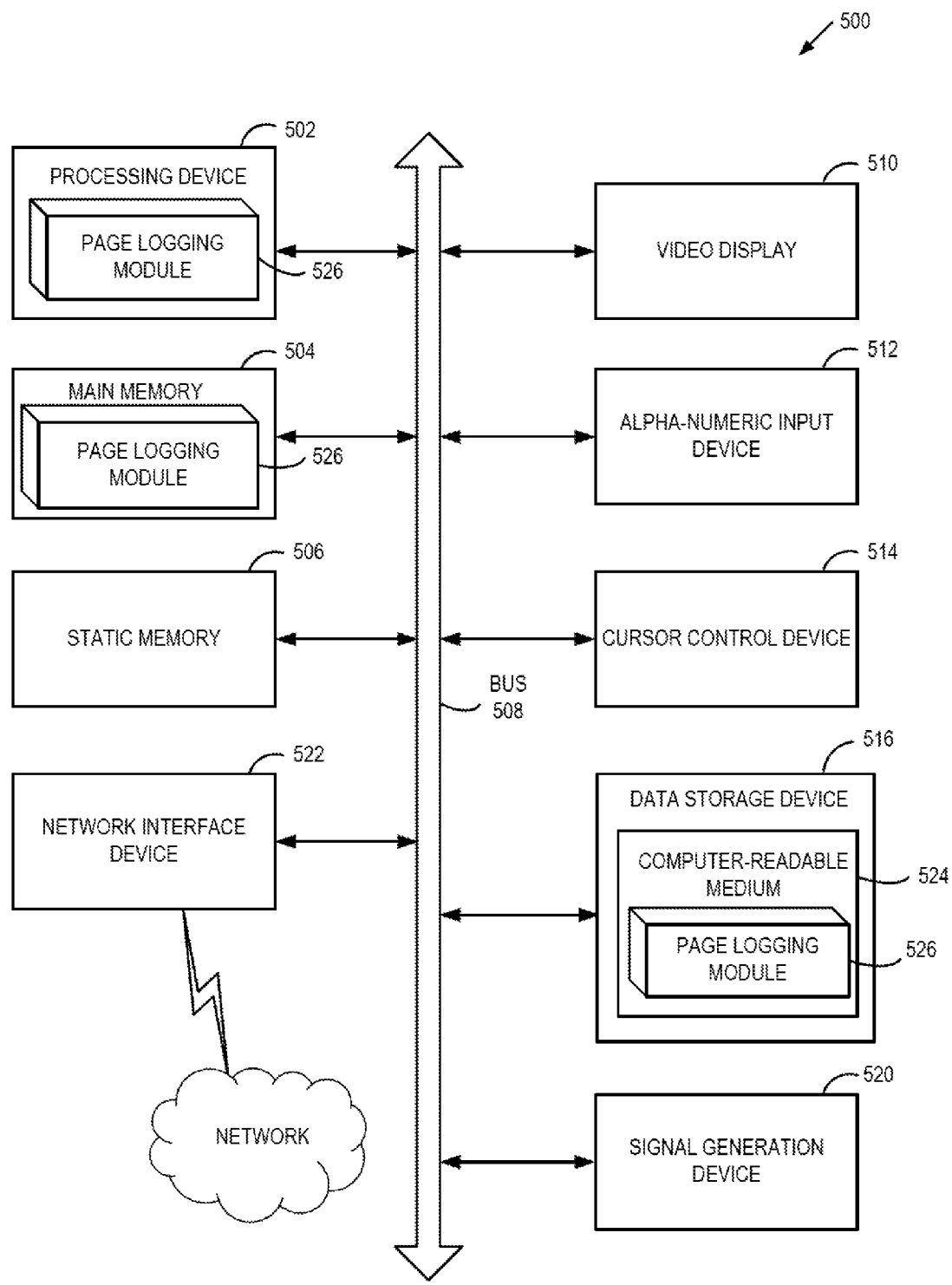
FIG. 5 depicts a block diagram of an illustrative computer system operating in accordance with examples of the invention.

FIG. 5 depicts an example computer system 500 which can perform any one or more of the methods described herein. In one example, computer system 500 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 902 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to page logging module 526 for performing the operations and steps discussed herein (e.g., corresponding to the methods of FIGS. 2-4, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a computer-readable medium 524 on which is stored page logging module 526 (e.g., corresponding to the methods of FIGS. 2-4, etc.) embodying any one or more of the methodologies or functions described herein. Page logging module 526 may also reside, completely or at least partially, within the main memory 504 and/or within the processing device 502 during execution thereof by the computer system 500, the main memory 504 and the processing device 502 also constituting computer-readable media. Page logging module 526 may further be transmitted or received over a network via the network interface device 522.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "mapping," "modifying," "detecting," "logging" "translating," "storing," "sending," "copying," or the like refer to the action and processes of a computer system, of similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer of other apparatus. Various general purpose systems may be used with programs in accordance with the teachings herein, or it may prove convenient construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:

identifying, by a processing device of a first host executing a hypervisor, a set of pages of a guest operating system (OS) of a virtual machine that are shared with an application associated with the guest OS, wherein the application is a virtual network interface controller (NIC) application, and wherein the virtual NIC application writes communication packets to the set of pages shared with the guest OS:

mapping, by the hypervisor, each of the set of pages associated with the guest OS to a corresponding page associated with the virtual NIC application, the mapping stored in a mapping table accessible by the hypervisor;

responsive to receiving, by the hypervisor, a request to migrate the virtual machine to a second host, modifying, by the hypervisor, a write protection attribute for each corresponding page associated with the virtual NIC application to cause a protection page fault upon the virtual NIC application attempt to update the corresponding page;

detecting, by the hypervisor, updated pages, wherein detecting updated pages comprises detecting the protection page fault upon the virtual NIC application attempt to update one of the corresponding pages associated with the virtual NIC application;

logging, by the hypervisor, a modification of each updated corresponding page, wherein logging the modification of each updated corresponding page comprises translating an address of the updated corresponding page associated with the virtual NIC application to a guest physical address of a corresponding shared page associated with the guest OS of the virtual machine; and determining, based on logged modifications of updated corresponding pages, whether the updated corresponding pages are to be copied to another location associated with migrating the virtual machine to the second host.

2. The method of claim 1, further comprising:
receiving, by the hypervisor, a request to monitor a plurality of memory pages associated with the virtual machine, the plurality of memory pages comprising the set of pages shared with the virtual NIC application.

3. The method of claim 2, wherein the request to monitor the plurality of memory pages comprises at least one of a request to migrate the virtual machine to the second host, a request to create a backup copy of a state of the virtual machine, or a request to copy at least one of the plurality of memory pages for use in emulating a graphical frame buffer.

4. The method of claim 1, wherein logging the modification comprises:
storing a virtual machine log file entry in a virtual machine log file, wherein the virtual machine log file stores a list of updated shared pages associated with the virtual machine, and wherein the virtual machine log file entry comprises the guest physical address of the corresponding shared page and an update status indicator set to a first value.

5. The method of claim 1, wherein logging the modification comprises:
storing an application log file entry in an application log file, wherein the application log file stores a list of updated pages associated with the virtual NIC application;
storing a virtual machine log file entry in a virtual machine log file, wherein the virtual machine log file stores a list of updated shared pages associated with the virtual machine, and wherein the virtual machine log file entry comprises the guest physical address of the corresponding shared page and an update status indicator set to a first value.

6. The method of claim 1, wherein logging the modification comprises at least one of sending the updated shared page to a remote hypervisor, copying the updated shared page to a data store; or sending the updated shared page to a client.

7. The method of claim 1, wherein the application comprises at least one of a second virtual machine, a component of the hypervisor, or an application executed by the hypervisor.

8. A computing apparatus comprising:
a memory to store instructions; and
a processing device, operatively coupled to the memory, to execute the instructions, wherein the processing device is to:
identify, by the processing device executing a hypervisor, a set of pages of a guest operating system (OS) of a virtual machine that are shared with an application associated with the guest OS, wherein the application is a virtual network interface controller (NIC) application, and wherein the virtual NIC application writes communication packets to the set of pages shared with the guest OS;
map, by the hypervisor, each of the set of pages of the guest OS to a corresponding page associated with the virtual NIC application, the mapping stored in a mapping table accessible by the hypervisor;
responsive to receiving, by the hypervisor, a request to migrate the virtual machine to a second host, modify, by the hypervisor, a write protection attribute for each corresponding page associated with the virtual NIC application to cause a protection page fault upon the virtual NIC application attempt to update the corresponding page;
detect, by the hypervisor, updated pages, wherein detecting updated pages comprises detecting the protection page fault upon the virtual NIC application attempt to update one of the corresponding pages associated with the virtual NIC application;
log, by the hypervisor, a modification of each updated corresponding page, wherein to log the modification, the processing device is to translate an address of the updated page associated with the virtual NIC application to a guest physical address of a corresponding shared page associated with the guest OS of the virtual machine; and
determine, based on logged modification of each updated corresponding pages, whether the updated corresponding pages are to be copied to another location associated with migrating the virtual machine to the second host.

9. The computing apparatus of claim 8, wherein the processing device is further to:
receive a request to monitor a plurality of memory pages associated with the virtual machine, the plurality of memory pages comprising the set of pages shared with the virtual NIC application; and
map each of the set of pages associated with the guest OS to a corresponding page associated with the virtual NIC application, the mapping stored in a mapping table accessible by the hypervisor.

10. The computing apparatus of claim 9, wherein the request to monitor the plurality of memory pages comprises at least one of a request to migrate the virtual machine to the second host, a request to create a backup copy of a state of the virtual machine, or a request to copy at least one of the plurality of memory pages for use in emulating a graphical frame buffer.

11. The computing apparatus of claim 8, wherein to log the modification, the processing device is to:
store a virtual machine log file entry in a virtual machine log file, wherein the virtual machine log file stores a list of updated shared pages associated with the virtual machine, and wherein the virtual machine log file entry comprises the guest physical address of the corresponding shared page and an update status indicator set to a first value.

12. The computing apparatus of claim 8, wherein to log the modification, the processing device is to:
store an application log file entry in an application log file, wherein the application log file stores a list of updated pages associated with the virtual NIC application;
store a virtual machine log file entry in a virtual machine log file, wherein the virtual machine log file stores a list of updated shared pages associated with the virtual machine, and wherein the virtual machine log file entry comprises the guest physical address of the corresponding shared page and an update status indicator set to a first value.

13. The computing apparatus of claim 8, wherein to log the modification, the processing device is further to at least one of send the updated shared page to a remote hypervisor, copy the updated shared page to a data store; or send the updated shared page to a client.

14. The computing apparatus of claim 8, wherein the application comprises at least one of a second virtual machine, a component of the hypervisor, or an application executed by the hypervisor.

15. A non-transitory computer readable storage medium, having instructions stored therein, which when executed by a processing device of a computer system, cause the processing device to:

identify, by the processing device executing a hypervisor, a set of pages associated with the guest operating system (OS) of a virtual machine that are shared with an application associated with the guest OS, wherein the application is a virtual network interface controller (NIC) application, and wherein the virtual NIC application writes communication packets to the set of pages shared with the guest OS;

map, by the hypervisor, each of the set of pages associated with the guest OS to a corresponding page associated with the virtual NIC application, the mapping stored in a mapping table accessible by the hypervisor, responsive to receiving, by the hypervisor, a request to migrate the virtual machine to a second host, modify, by the hypervisor, a write protection attribute for each corresponding page associated with the virtual NIC application to cause a protection page fault upon the virtual NIC application attempt to update the corresponding page;

detect, by the hypervisor, updated pages, wherein detecting updated pages comprises detecting the protection page fault upon the virtual NIC application attempt to update one of the corresponding pages associated with the virtual NIC application;

log, by the hypervisor, a modification of each updated corresponding page, wherein to log the modification, the processing device is to translate an address of the updated page associated with the virtual NIC application to a guest physical address of a corresponding shared page associated with the guest OS of the virtual machine; and determine, based on logged modification of each updated corresponding pages, whether the updated corresponding pages are to be copied to another location associated with migrating the virtual machine to the second host.

16. The non-transitory computer readable storage medium of claim 15, wherein to log the modification, the processing device is to:

store a virtual machine log file entry in a virtual machine log file, wherein the virtual machine log file stores a list of updated shared pages associated with the virtual machine, and wherein the virtual machine log file entry comprises the guest physical address of the corresponding shared page and an update status indicator set to a first value.

17. The non-transitory computer readable storage medium of claim 15, wherein to log the modification, the processing device is to:

store an application log file entry in an application log file, wherein the application log file stores a list of updated pages associated with the virtual NIC application;

store a virtual machine log file entry in a virtual machine log file, wherein the virtual machine log file stores a list of updated shared pages associated with the virtual machine, and wherein the virtual machine log file entry comprises the guest physical address of the corresponding shared page and an update status indicator set to a first value.

18. The non-transitory computer readable storage medium of claim 15, wherein the application comprises at least one of a second virtual machine, a component of the hypervisor, or an application executed by the hypervisor.

* * * * *